United States Patent [19]
Hamilton et al.

[11] Patent Number: 5,855,424
[45] Date of Patent: Jan. 5, 1999

[54] APPLIANCE SHELVING SUPPORT SYSTEM

[75] Inventors: Roger E. Hamilton, Galesburg, Ill.;
Todd J. Tunzi, Newton, Iowa

[73] Assignee: Maytag Corporation, Newton, Iowa

[21] Appl. No.: 869,167

[22] Filed: Jun. 4, 1997

[51] Int. Cl.$^6$ .................................................. A47B 96/04
[52] U.S. Cl. ............................ 312/408; 312/406; 62/298
[58] Field of Search .................................... 312/407, 408,
312/406, 406.1, 351, 140, 401; 248/235;
403/263; 62/298, 440

[56] References Cited

U.S. PATENT DOCUMENTS

| | | | |
|---|---|---|---|
| 2,118,659 | 5/1938 | Sywert | ...................... 312/408 |
| 2,146,950 | 2/1939 | Foster . | |
| 2,620,255 | 12/1952 | Beckett | .............. 312/408 X |
| 2,684,884 | 7/1954 | Devery . | |
| 2,852,329 | 9/1958 | Smith . | |
| 3,669,520 | 6/1972 | Jansen . | |
| 3,917,206 | 11/1975 | Fisher . | |
| 4,026,004 | 5/1977 | Fields et al. | ........................ 312/406 X |
| 4,107,833 | 8/1978 | Knight et al. . | |
| 4,190,305 | 2/1980 | Knight et al. . | |
| 4,195,888 | 4/1980 | Squire . | |
| 4,735,468 | 4/1988 | Taylor, Jr. et al. . | |
| 5,361,599 | 11/1994 | Dasher . | |
| 5,577,822 | 11/1996 | Seon | ................... 312/407 X |

FOREIGN PATENT DOCUMENTS

| | | |
|---|---|---|
| 837459 | 3/1952 | Germany . |
| 193892 | 1/1965 | Sweden ................................. 312/408 |

Primary Examiner—Peter R. Brown
Assistant Examiner—James O. Hansen
Attorney, Agent, or Firm—Everett G. Diederiks, Jr.

[57] ABSTRACT

A shelving support system for use in an appliance, having an outer shell within which is positioned a compartment defining liner having first and second opposing side walls spaced from the outer shell by an insulation zone, includes a plurality of first shelf supporting sockets that are integrally formed, at spaced locations, with the first side wall of the liner and a plurality of second shelf supporting sockets that are received within apertures formed in the second side wall of the liner. Each of the first and second sockets define cavities within which terminal ends of shelving members can be received. Each of the second shelf supporting sockets includes an angled body portion with the forwardmost second shelf supporting sockets within the liner defining compartment being preferably angled downwardly and the aft second shelf supporting sockets having body portions which are angled rearwardly relative to the compartment. The body portions are formed with ribs which aid in maintaining the second shelf supporting sockets in the apertures following the placement of insulation within the insulation zone.

20 Claims, 3 Drawing Sheets

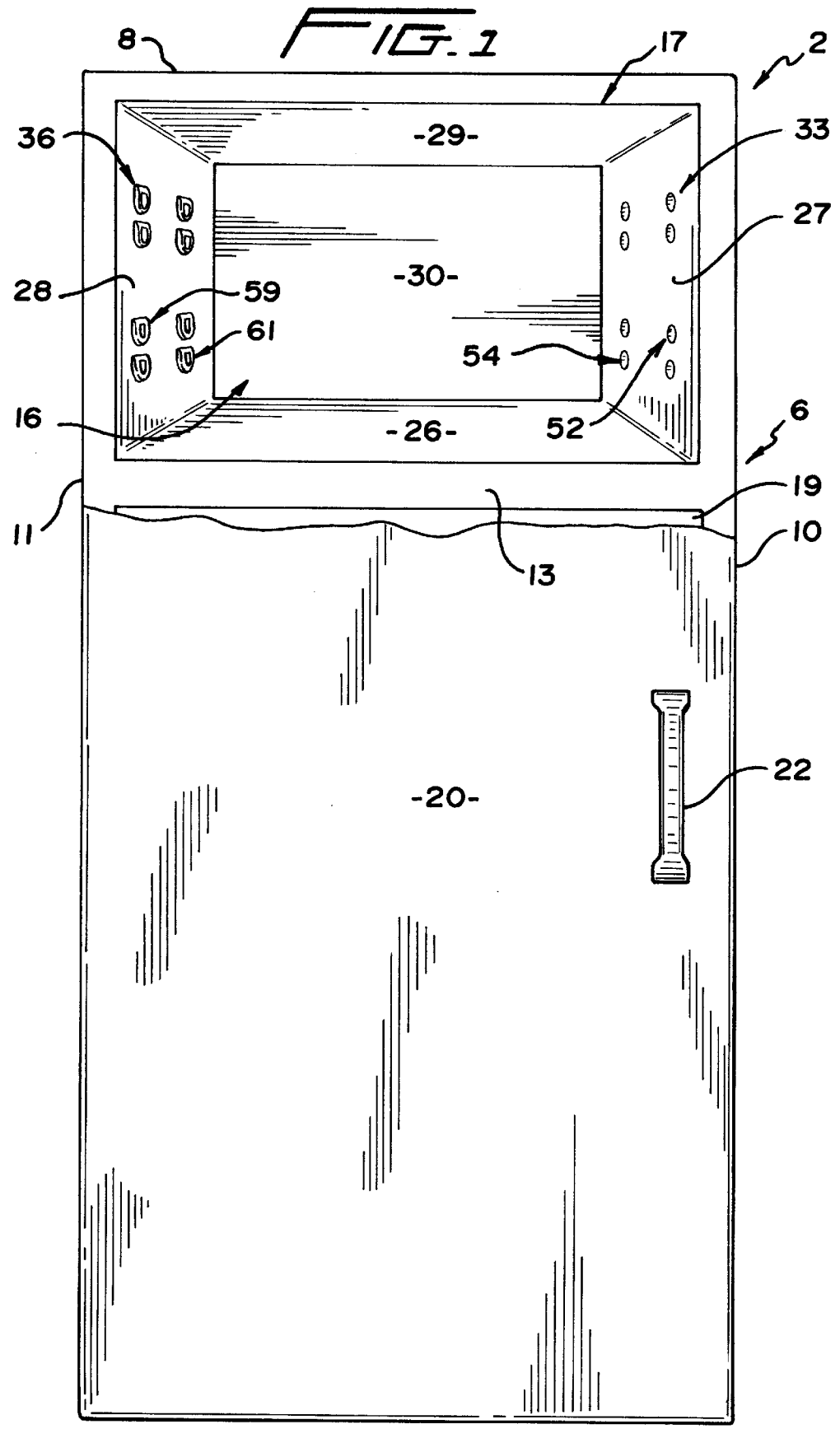

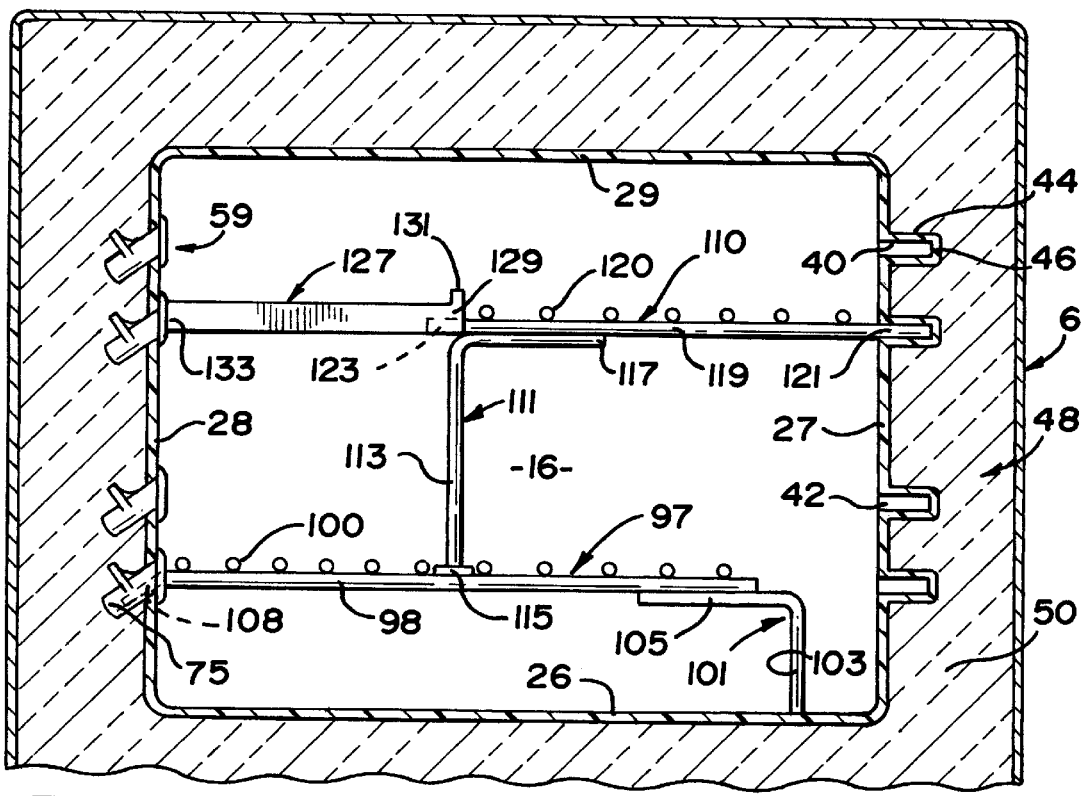
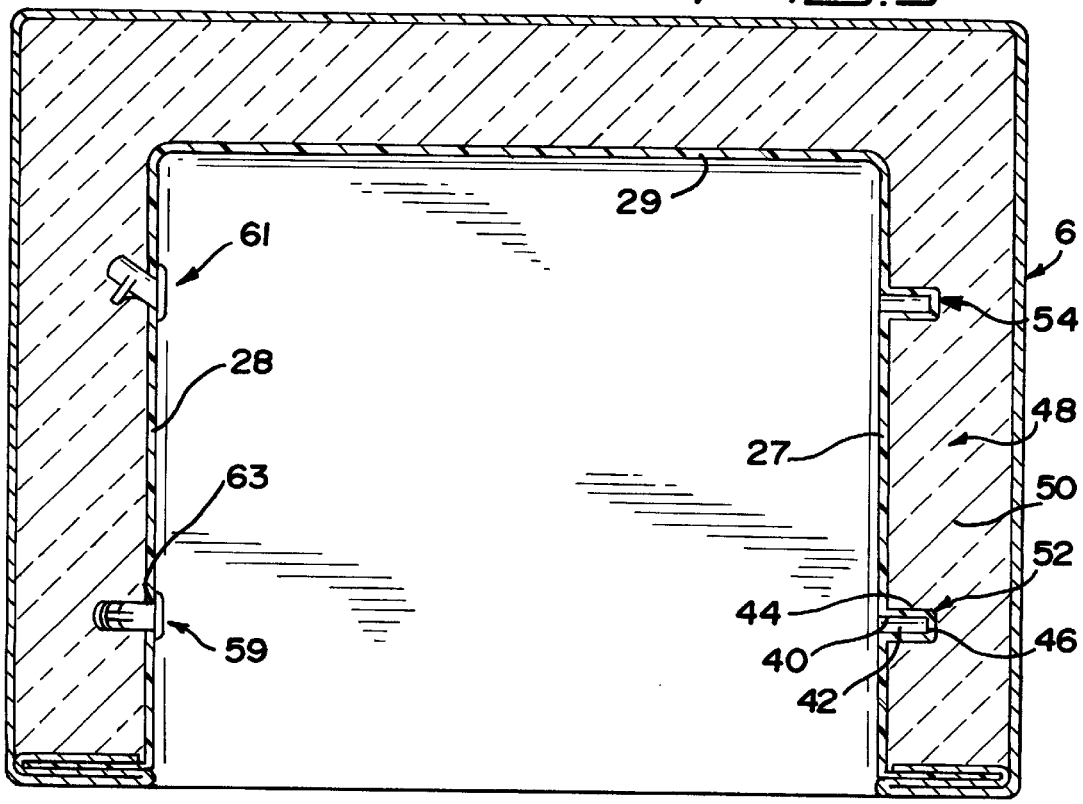

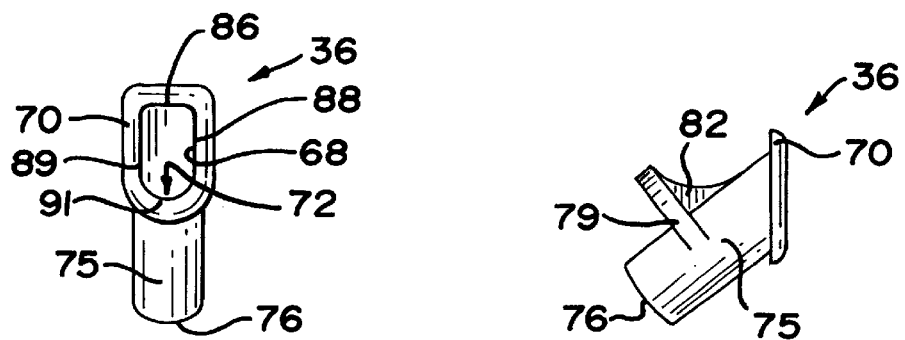
FIG. 4
FIG. 5
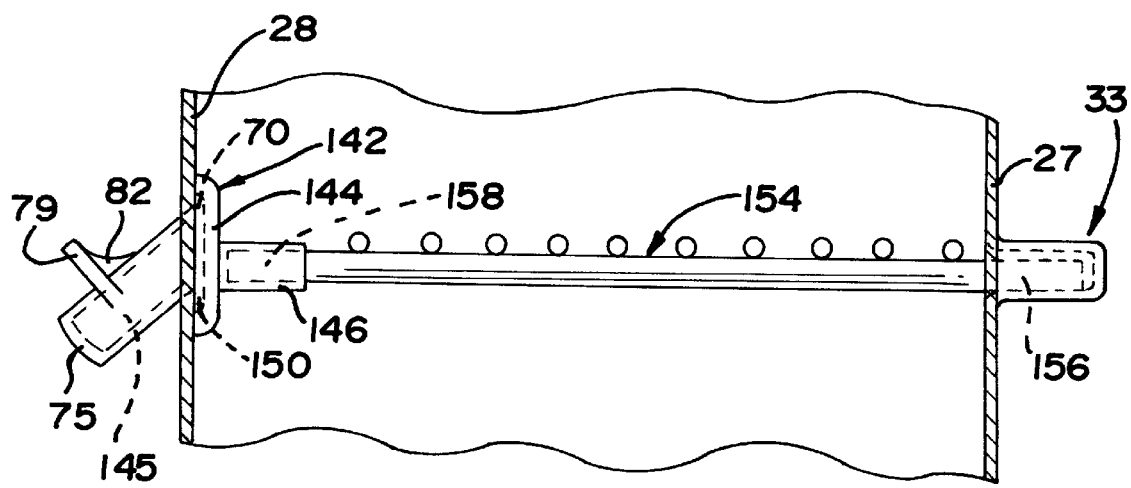
FIG. 6
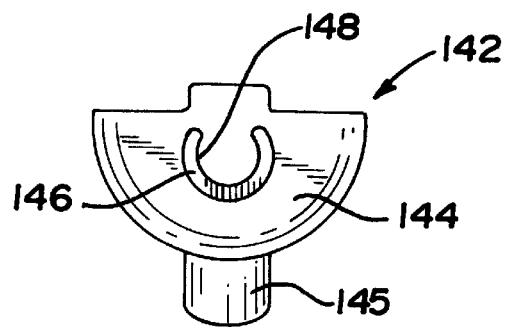
FIG. 7

APPLIANCE SHELVING SUPPORT SYSTEM

BACKGROUND OF THE INVENTION

1. Field of the Invention

The present invention pertains to an appliance having an outer shell within which is positioned a liner having walls which are spaced from the outer shell so as to define an insulation zone therebetween and, more particularly, to a system used to support shelving extending across the liner walls in such an appliance, as well as a method of supporting the shelving.

2. Discussion of the Prior Art

In various types of appliances, it is common to provide some structure which will enable one or more shelves to be mounted within a given appliance compartment. For example, in a common household refrigerator, numerous shelves are generally provided in order to enable various items to be supported at different vertical storage positions. In the prior art, these shelves are typically supported through specific mounting structure provided within the refrigerator. Such mounting structure includes: integrally forming shelf supporting rails with a molded liner that defines the interior walls of a given refrigerator compartment; securing mounting brackets to opposing side walls of the liner through the use of mechanical fasteners; and positioning mounting sockets or grommets within apertures formed in the liner. Since it is highly desirable to permit these shelves to be vertically adjusted to selectively configure the overall shelving arrangement so as to accommodate varying sized items, multiple levels of these known mounting structures are generally provided in the refrigerator.

When forming the liner of a refrigerator or other appliance, it is desirable to minimize the required thickness of the liner to reduce manufacturing costs. When the liner is integrally formed with shelf supporting rails, the liner must be appropriately thickened at the rails to some extent in order to assure that the rails will not fail under load conditions. Therefore, forming the shelf supporting structure in this manner generally adds to the manufacturing cost of the liner. In addition, if such a supporting rail were to fail or become damaged during use, serviceability is greatly limited.

Forming the mounting structure by attaching mechanical fastener secured brackets to opposing side walls of the liner provides for enhanced servicing in the case of part failure since a new bracket can be readily installed in place of the damaged bracket. However, since any given shelf will generally require four or more mounting brackets and numerous shelves are provided, the original appliance assembly can be quite cumbersome and time consuming. In addition, this type of mounting structure has several parts which itself can add to the cost associated with manufacturing of the appliance.

Attaching mounting sockets or grommets in each of the opposed liner walls in order to support shelves therefrom can advantageously simplify the assembly process. In the type of appliances to which the present invention is directed, it has been proposed to arrange mounting sockets in apertures provided in each of the opposed liner side walls and to retain the mounting sockets in desired positions through an in-situ foaming process. More specifically, body portions of the mounting sockets are generally positioned within apertures provided in the opposing side walls of the liner after the liner has been placed in an outer cabinet shell of the appliance. Thereafter, the space between the liner and the cabinet shell is injected with foam insulation which will inherently flow about the body portions of the mounting sockets. Once solidified, the insulation tends to retain the mounting sockets in desired positions. It has also been proposed to provide each mounting socket with an annular flange at one end, as well as locating structure on the body portion of the socket at a position spaced from the annular flange a distance approximately equal to the thickness of the liner. With this arrangement, the socket can be snapped into a respective aperture with the liner being arranged between the annular flange and the locating structure in order to hold the socket in the desired position for the foam insulating operation.

Even though utilizing mounting sockets in the manner described above to support shelving within a compartment of an appliance reduces the number of supporting components and can simplify the assembly process as compared to previously proposed arrangements, these mounting socket arrangements still require an abundance of assembly steps that are typically performed manually. Therefore, during the assembly of a refrigerator cabinet, for example, after one or more liners are inserted within a cabinet shell, but before the insulating process, an individual mounting socket must be inserted into each of the apertures provided on both of the opposed side walls of the liner. Considering the repetitive nature of this endeavor, a fair amount of labor time is required to perform this step in the overall assembly process. In addition, the body portions of such known sockets extend generally perpendicular to the liner side walls. With this arrangement, the sockets tend to be forced back through the apertures during the in situ foaming process. Also, given the tolerances that must exist between the length of the shelf and the distance spanning the opposing liner side walls in order to mount a shelf that extends between the opposing side walls using such sockets, it is possible that the shelf can rotate and become dislodged from one or more of the sockets.

Based on the above, there exists a need in the art for a system that can be used to support shelving within an appliance with minimal effort, time and associated cost. In addition, there exists a need in the art for a shelving support system including sockets that are configured to enhance the ability of the sockets to be retained in a desired position while cooperating with shelf structure to prevent the shelf from rotating out of alignment. Furthermore, there exists a need in the art for a shelving support system that is extremely versatile such that it can be used with various types of shelf designs.

SUMMARY OF THE INVENTION

A system for supporting various types of shelves in a compartment of an appliance having an outer shell within which is positioned a compartment defining liner having walls spaced from the outer shell so as to define an insulation zone therebetween is provided. The shelving support system includes a plurality of first and second shelf supporting sockets, each of which defines a cavity that opens into the compartment defined by the liner. The first shelf supporting sockets are integrally formed, at spaced locations, with one side wall of the liner and the second shelf supporting sockets include body portions that extend into apertures formed in an opposing side wall of the liner. The body portions are preferably arranged at acute angles within the insulation zones and are provided with ribs which can cooperate with insulation placed within the insulation zone in order to securely retain the second shelf supporting sockets in desired positions. In the preferred embodiment, the second shelf supporting sockets are arranged as front and rear socket member sets with the body portion of each of the front socket members being angled downwardly and the rear socket members being angled rearwardly with respect to the overall appliance cabinet. The first and second shelf supporting sockets can directly receive respective end portions of shelves positioned within the appliance compartment or one or more sets of these sockets can receive supplemental shelf support brackets that define seats upon which a shelf can rest.

With this arrangement, manual shelf support assembly time is essentially reduced in half as compared to the known prior art since the first shelf supporting sockets are integrally formed with the liner. Once the second set of shelf supporting sockets are positioned in their respective apertures and insulation is placed in the zone between the liner and the appliance shell, the second shelf supporting sockets will be securely retained in their desired positions, particularly in view of the presence of the ribs. Due to the angling of the body portions of the second shelf supporting sockets and the provision for auxiliary shelf support brackets to be mounted therein, the overall shelving support system of the present invention provides an enhanced and versatile configuration that prevents undesired shifting of various types of shelves that can be mounted thereby. A method of mounting a shelving support system utilizing the socket configuration described above is also provided in accordance with the invention.

Additional features and advantages of the present invention will become more readily apparent from the following detailed description of the preferred embodiments thereof when taken in conjunction with the drawings wherein like reference numerals refer to corresponding parts in the several views.

BRIEF DESCRIPTION OF THE DRAWINGS

FIG. 1 is a front respective view of a refrigerator incorporating the shelving support system of the present invention in an upper freezer compartment thereof;

FIG. 2 is a partial cross-sectional front view of the freezer compartment shown in FIG. 1 with a first type of shelving configuration arranged therein;

FIG. 3 is a partial cross-sectional top view of the upper freezer compartment of FIG. 1;

FIG. 4 is a front view of a mounting socket member incorporated in the shelving support system of the invention;

FIG. 5 is a side view of the mounting socket of FIG. 4;

FIG. 6 is a partial cross-sectional front view illustrating the shelving support system of the invention in a second shelf supporting mode of use; and FIG. 7 is a front view of an auxiliary shelving support member adapted to be used in accordance with the present invention.

DETAILED DESCRIPTION OF THE PREFERRED EMBODIMENTS

With initial reference to FIG. 1, a refrigerator 2 is shown which comprises a cabinet shell 6 including a top wall 8 and side walls 10 and 11. As is known in the art, cabinet shell 6 of refrigerator 2 is generally made of sheet metal and also includes a rear wall (not shown) that is secured to each of the top and side walls 8, 10 and 11. In the embodiment depicted for descriptive purposes, refrigerator 2 constitutes a top mount style refrigerator and therefore includes a mullion 13 which separates the interior of refrigerator 2 into an upper freezer compartment 16, that is defined by a liner 17 positioned within cabinet shell 6, and a fresh food compartment 19, that is located below mullion 13 and which has an access door 20 positioned thereacross. As is also well known in the art, door 20 can be opened by means of a handle 22 and is pivotally mounted through lower and central hinge units (not shown). Of course, freezer compartment 16 would also be provided with a door that could be selectively opened and closed and which would pivot upon central and upper hinge units (not shown). However, in order to better illustrate the aspects of the present invention, such a freezer door has not been shown in FIG. 1.

Liner 17 of upper freezer compartment 16 is preferably molded as an integral plastic member that includes a bottom 26, opposing side walls 27 and 28, a top wall 29 and a rear wall 30. The present invention is particularly directed to a shelving support system which is illustrated for use within upper freezer compartment 16. The shelving support system includes a plurality of first shelf supporting sockets, generally indicated at 33, that are provided on side wall 27 and a plurality of second shelf supporting sockets, generally indicated at 36, which are adapted to be secured at side wall 28 of liner 17.

With reference to FIGS. 1–3, each shelf supporting socket 33 is integrally formed as part of side wall 27 of liner 17 in accordance with the present invention. Each shelf supporting socket 33 has an opening 40 that leads from upper freezer compartment 16 into an internal cavity 42 defined by a cylindrical wall 44 and a terminal end wall 46 of the shelf supporting socket 33. As clearly shown in FIGS. 2 and 3, cylindrical wall 44 defines a body portion of shelf supporting socket 33 and this body portion extends into an insulation zone 48 defined between liner 17 and cabinet shell 6 of refrigerator 2. Insulation zone 48 is adapted to receiving insulation 50 which, in the preferred embodiment, constitutes foamed insulation that is injected into insulation zone 48.

In accordance with the preferred embodiment of the invention shown, each shelf supporting socket 33 is identically constructed and arranged in fore-to-aft spaced pairs. As clearly shown in FIGS. 1 and 3, each pair includes a front socket member 52 and a rear socket member 54 that are preferably arranged in a substantially horizontal plane. In a similar manner, second shelf supporting sockets 36 are preferably arranged in fore-to-aft spaced pairs, each of which is defined by a front socket member 59 and a rear socket member 61. Each of the second shelf supporting sockets 36 are adapted to be received in respective apertures 63 formed in side wall 28 of liner 17. As will become more evident below, each aperture 63 is preferably oblong in shape to conform to the shape of the respective shelf supporting socket 36 received therein.

In accordance with the preferred embodiment, the second shelf supporting sockets 36 are identically constructed and this construction is best shown in FIGS. 4 and 5. As illustrated, each shelf support socket 36 includes an opening 68 having extending thereabout an annular flange 70 that leads into a cavity 72 provided within a body portion 75. Body portion 75 terminates at a closed end 76. Between flange 70 and closed end 76 of body portion 75 is provided at least one rib member 79 which projects at an angle (preferably perpendicular) to a longitudinal axis of body portion 75. In accordance with the preferred embodiment, each shelf supporting socket 36 is injection molded and includes a reinforcing gusset 82 interconnecting rib member 79 with body portion 75.

As shown in these figures, opening 68 is preferably oblong as defined by straight end portion 86, straight side portions 88 and 89 and an arcuate end portion 91. In addition, body portion 75 is arranged at a angle (preferably approximately 45°) relative to annular flange 70. Although each shelf supporting socket 36 is preferably identically constructed in accordance with the present invention as indicated above, the manner in which body portion 75 is arranged relative to liner 17 in upper freezer compartment 16 preferably differs with respect to front and rear socket members 59 and 61 as best represented in FIGS. 2 and 3. More specifically, FIG. 2 clearly shows each of the front socket members 59 being positioned within respective apertures 63 with each body portion 75 being angled downwardly relative to each of upper freezer compartment 16 and liner 17, as well as refrigerator 2 in general.

However, each rear socket member 61 has a respective body portion 75 that is preferably angled rearwardly relative to upper freezer compartment 16 and liner 17 as clearly shown in FIG. 3. Given that front and rear socket members 59 and 61 are identically constructed, and preferably define oblong openings 68, apertures 63 must conform in shape to the angling of front and rear socket members 59 and 61. This shaping of apertures 63 is preferable since it will assure that each second shelf supporting socket 36 can only be inserted within a respective aperture 63 at a desired angle. The reason for angling second shelf supporting sockets 36 will become more fully apparent below.

When assembling of refrigerator 2, liner 17 will be placed within cabinet shell 6 with the first shelf supporting sockets 33 being already pre-formed, along with apertures 63. Thereafter, each of the second shelf supporting sockets 36 is inserted into a respective aperture 63 until annular flange 70 abuts liner 17. Of course, once annular flange 70 abuts liner 17, the body portion 35 of each front socket member 59 will extend downwardly and the body portion 75 of each rear socket member 61 will extend rearwardly given the shape of each second shelf supporting socket 36 and apertures 63. After shelf supporting sockets 36 are properly positioned, insulation 50 is injected into insulation zone 48 so as to fill the volume between cabinet shell 6 and liner 17. During this process, insulation 50 will flow about body portion 75 and rib 79 of each second shelf supporting socket 36. Once the foamed insulation 50 solidifies, each second shelf supporting socket 36 will be fixedly retained in a desired position as illustrated in these figures.

At this point, it should be realized that additional structure could be provided on each shelf supporting socket 36 to enable the sockets 36 to be initially retained within apertures 63 prior to the solidifying of the foamed insulation 50. For example, body portion 75 could be provided with an annular ridge (not shown) that is spaced from annular flange 70 a distance corresponding to the thickness of liner 17 such that each shelf supporting socket 36 is snapped into a respective aperture 63. Of course, pressure could also be simply applied against the flanges 70 of shelf supporting sockets 36 to force flanges 70 against liner 17 until the insulation 50 is fully cured. In either case, it is the solidification of the foamed insulation 50 which substantially performs the function of retaining the shelf supporting socket 36 in their desired positions.

As clearly shown in FIGS. 1 and 2, multiple, vertically spaced sets of first and second shelf supporting sockets 33 and 36 are provided to enable various shelves to be mounted within freezer compartment 16 in a versatile manner. FIG. 2 shows one potential shelving arrangement wherein a lower shelf 97, defined by front and rear spaced support rods 98 and fore-to-aft extending item support rails 100, is placed within freezer compartment 16 and supported at one end by an end support bracket 101 having a first leg 103 and engages bottom 26 and a second leg 105 upon which support rods 98 rest. Although FIG. 2 is a front view, it should be readily apparent that the entire shelf 97 extends fore-to-aft in freezer compartment 16. The forwardmost support rod 98 includes a front terminal end 108 that is received within a respective front socket member 59 and which is angled downwardly in a manner corresponding to body portion 75. In a similar manner, lower shelf 97 would include a rear support rod (not shown) having a terminal end that would angle rearwardly so as to conform to the angling of the body portion 75 of a respective rear socket member 61 (refer to FIG. 3). In this way, lower shelf 97 could be supported by a lower pair of socket members 59 and 61, as well as support bracket 101.

Another shelf 110 can be supported by means of a bracket 111 that includes a vertical leg 113 having a base 115 that extends across lower shelf 97 and a horizontal leg 117 upon which are positioned support rods 119, only one of which is shown in FIG. 2. Support rods 119 carry support rails 120 for the placement of food items within freezer compartment 16. As depicted, a first end 121 of each support rod 119 extends into a cavity 42 of a respective first shelf supporting socket 33 and a second end 123 thereof is cantilevered over support bracket 111. A plastic ice tray pan 127 is shown having a first lateral end 129 which rests upon second ends 123 of support rods 119. First lateral end 129 includes an upstanding ledge member 131 which is provided to limit relative shifting movement of ice trays placed upon pan 127. A second lateral end 133 of plastic ice pan 127 would have elements (not shown) which are received within cavities 72 of a respective upper pair of front and rear socket members 59 and 61 in a manner directly analogous to the supporting of lower shelf 97. Of course, the shelving arrangement illustrated in FIG. 2 is presented for exemplary purposes only and it should be readily apparent that the shelving support system of the present invention represents an extremely versatile supporting system that can be used with various types of wire shelving, such as that represented by shelves 97 and 110, or plastic shelf members, such as that represented by pan 127.

FIGS. 6 and 7 illustrate another manner in which the shelving support system of the present invention could be used to support another type of shelf. As illustrated, an auxiliary shelf supporting bracket 142 is provided with a face plate 144, a support shaft 145 which extends from one side surface of face plate 144 and an arcuate seat member 146 that extends from an opposing side surface of face plate 144. Arcuate seat member 146 extends into freezer compartment 16 and defines a trough 148. On the other hand, support shaft 145 generally defines a cylindrical member that is arranged at an angle relative to face plate 144 corresponding to the angle of body portion 75 to flange 70 of second shelf supporting socket 36. With this arrangement, shelf support shaft 145 of shelf supporting bracket 142 can be inserted within a respective cavity 72 such that face plate 144 rests upon liner 17. Face plate 144 defines a rear recess 150 that is adapted to extend about annular flange 70. A shelf/rack 154, having first and second ends 156 and 158 arranged in an substantially horizontal plane, is supported within freezer compartment 16 with first end 156 extending within a respective pair of shelf supporting sockets 33 and second end 158 being received within troughs 148 of seat members 146 in a pair of front and rear shelf supporting brackets 142. In the preferred embodiment, each shelf supporting bracket 142 is made of plastic and arcuate seat member 146 is adapted to receive second end 158 of shelf/rack 154 in a snap-fit manner.

Based on the above, it should be readily apparent that the shelving support system of the present invention minimizes the assembly time for the shelving support structure within refrigerator 2 since only the second shelf supporting sockets 36 need to be inserted within apertures 63. Therefore, a minimum number of components are utilized and forming the second shelf supporting sockets 36 of plastic enables them to be efficiently manufactured. The cooperation between the shape of second shelf supporting sockets 36 to that of apertures 63 avoids any potential misalignment during the assembly process. The angling of front and rear socket members 59 and 61 advantageously prevents rotation of any shelf supported thereby. This could be particularly important if a slidable basket was supported beneath a shelf as the shelf would have a tendency to rotate when the basket is pulled open.

Given that there is a fixed distance between side walls 27 and 28 of liner 17, the distance from each cavity 42 to a respective cavity 72 is made greater than the length of any supporting rod of the shelf mounted between opposing side walls 27 and 28 of liner 17. More specifically, a terminal end of the respective shelf support rod can be received within a respective cavity 42 a distance that enables the other end of the support rod to be freely aligned with a cavity 72 of a corresponding second shelf supporting socket 36. However, once the support rod is received within a respective pair of front and rear socket members 59 and 61, the shelf would be retained against shifting laterally, at least due to the angling of body portions 75. Therefore, when mounted, the end of a shelf support rod arranged at side wall 27 does not extend fully into cavity 42. Of course, the opposite could be true with respect to cavity 72. However, the shelf could be readily removed by raising the shelf at side wall 28 while simultaneously pivoting the shelf away from side wall 28. Finally, it should also be realized that the side walls at which the pairs of first and second shelf supporting socket 33 and 36 are arranged could be easily reversed.

Although described with respect to preferred embodiments of the invention, it should be readily understood that various changes and/or modifications can be made to the invention without departing from the spirit thereof. In general, the invention is only intended to be limited by the scope of the following claims.

We claim:

1. In an appliance having an outer shell within which is positioned a compartment defining liner having first and second opposing side walls spaced from the outer shell by an insulation zone, a shelving support system comprising:
   a plurality of first shelf supporting sockets, said first shelf supporting sockets being integrally formed, at spaced locations, with the first side wall of said liner;
   a plurality of apertures formed in the second side wall of said liner at spaced locations;
   a plurality of second shelf supporting sockets, said second shelf supporting sockets including body portions defining internal cavities, said body portions extending into said apertures with said cavities opening into the compartment defined by said liner; and
   insulation arranged in said insulation zone, said insulation extending about the body portions of said second shelf supporting sockets to retain said second shelf supporting sockets in said apertures.

2. The shelving support system according to claim 1, wherein the body portions of said second shelf supporting sockets are angled within said insulation zone.

3. The shelving support system according to claim 2, wherein said second shelf supporting sockets include at least a front socket member and a rear socket member, the body portion of said front socket member being angled downwardly within said insulation zone.

4. The shelving support system according to claim 3, wherein the body portion of the rear socket member is angled rearwardly within said insulation zone.

5. The shelving support system according to claim 2, wherein each of said second shelf supporting sockets further includes a liner engaging flange having a rear surface from which a respective said body portion extends.

6. The shelving support system according to claim 1, further comprising at least one rib projecting outwardly from the body portion of each of said second shelf supporting sockets.

7. The shelving support system according to claim 1, further comprising an auxiliary shelf supporting bracket including a support portion adapted to be positioned within the internal cavity of a respective said second shelf supporting socket and a seat portion upon which a section of a shelf is adapted to be positioned.

8. In an appliance having an outer shell within which is positioned a compartment defining liner having first and second opposing side walls spaced from the outer shell by an insulation zone, the shelving support system comprising:
   a plurality of apertures formed in at least one of said first and second opposing side walls; and
   a plurality of shelf supporting sockets, each of said shelf supporting sockets including a body portion and a flange portion, said body portion having a first end section and a second, open end section that leads into an internal cavity defined within the body portion, said flange portion extending about the second, open end section, each of said shelf supporting sockets being positioned in a respective one of said apertures with said flange portion being positioned against said liner and said body portion extending into said insulation zone, with substantially the entire body portion being at an acute angle relative to said liner.

9. The shelving support system according to claim 8, further comprising:
   insulation provided in said insulation zone; and
   at least one rib projecting outwardly from the body portion of each of said shelf supporting sockets, said ribs being encapsulated by the insulation placed within said insulation zone.

10. The shelving support system according to claim 8, wherein said plurality of apertures are formed in said first opposing side wall and said shelving support system further comprises a plurality of additional supporting sockets that are integrally formed with said second opposing side wall of said liner.

11. The shelving support system according to claim 8, wherein said shelf supporting sockets are arranged on said at least one of said first and second opposing side walls as front and rear socket member pairs.

12. The shelving support system according to claim 11, wherein the body portion of each said front socket member is angled downwardly within said insulation zone.

13. The shelving support system according to claim 12, wherein the body portion of each said rear socket member is angled rearwardly within said insulation zone.

14. The shelving support system according to claim 8, further comprising: auxiliary shelf support brackets each of which includes a support portion adapted to be received within the cavity defined within the body portion of a respective one of said shelf supporting sockets and a seat portion adapted to project within the compartment for supporting a shelf member thereon.

15. The shelving support system according to claim 14, wherein the seat portion defines a shelf receiving trough.

16. A method of forming a shelving support system in an appliance compartment which is defined by a liner having first and second opposing side walls that are spaced from an outer shell of the appliance by an insulation zone, said method comprising:

integrally forming a first set of shelf supporting sockets with the first side wall of said liner;

providing a plurality of apertures in the second side wall of said liner;

inserting cavity defining body portions of a second set of shelf supporting sockets into said apertures, at an acute angle, until flanges provided at open ends of the body portions engage said liner; and securing said second set of shelf supporting sockets in said apertures.

17. The method of forming a shelving support system according to claim 16, further comprising:

forming each of the second set of the shelf supporting sockets with the body portion extending at an acute angle from a respective said flange.

18. The method of forming a shelving support system according to claim 16, further comprising:

securing said second set of shelf supporting sockets in said apertures by injecting foam insulation within said insulation zone such that said foamed insulation solidifies about the body portions of said second set of shelf supporting sockets.

19. The method of forming a shelving support system according to claim 18, further comprising:

providing ribs that project outwardly from the body portions of the second set of shelf supporting sockets for engagement with the foamed insulation.

20. The method of forming a shelving support system according to claim 16, further comprising:

providing the second set of shelf supporting sockets as pairs of first and second socket members;

angling the body portions of the first set of socket members downwardly with said insulation zone; and angling the body portions of the second set of socket members rearwardly within said insulation zone.

\* \* \* \* \*